S. ROCKAFELLOW.
HARVESTER.
No. 78,236. Patented May 26, 1868.
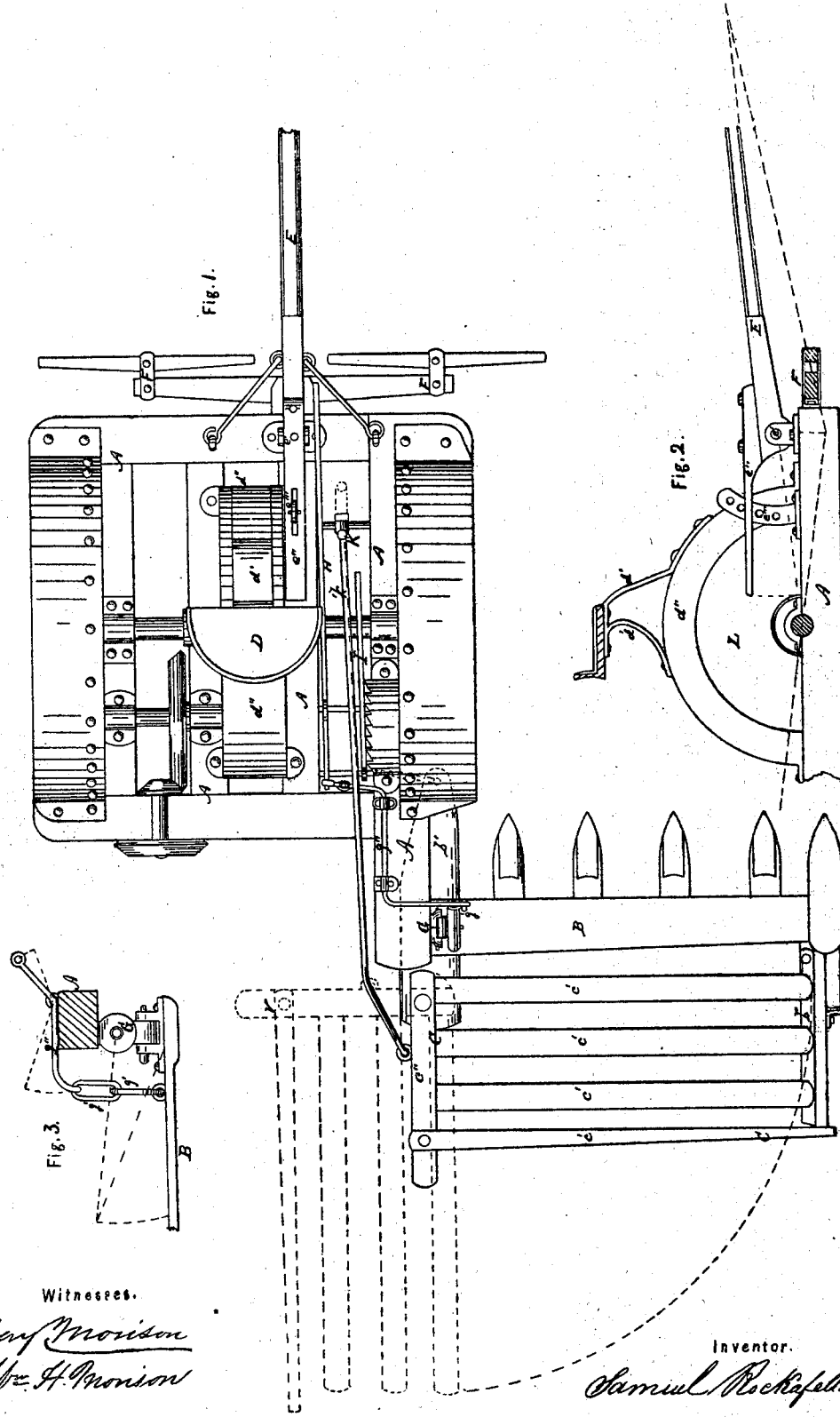

United States Patent Office.

SAMUEL ROCKAFELLOW, OF MUSCATINE, IOWA.

Letters Patent No. 78,236, dated May 26, 1868.

IMPROVEMENT IN HARVESTERS.

*The Schedule referred to in these Letters Patent and making part of the same.*

TO ALL WHOM IT MAY CONCERN:

Be it known that I, SAMUEL ROCKAFELLOW, of Muscatine, in the county of Muscatine, and State of Iowa, have invented a new and useful Improvement in Mowers and Reapers; and I do hereby declare that the following is a full, clear, and exact description of the construction and operation of the same, reference being had to the accompanying drawings, making a part of this specification, in which—

Figure 1 is a plan view of the said improved machine,

Figure 2 a sectional side elevation, and

Figure 3 a representation of the double-hinge connecting-links and lever for elevating the cutter-bar—

Like letters of reference indicating the same parts when in the different figures.

The object of my improvement is to afford better facilities to the operator for guiding and controlling the cutter-bar during the operation of the machine; and my invention consists in the peculiar construction and application of a double hinge for connecting the cutter-bar to the frame of the machine, in combination with links, cranks, and levers, for operating the said bar, substantially as hereinafter specified.

Referring to the drawings, A is the frame of the machine; B, the cutter-bar; C, the side-delivery dropper; D, the driver's seat; E, the tongue; F, the double-tree; G the double hinge; $g'$, the links; and $g''$ the crank for connecting and elevating the outer end of the cutter-bar.

The frame A is supported upon an axle and two wheels in the usual manner. The cutter-bar B is connected to the rear end of the frame A by means of the double hinge G, which is a block of metal connecting the frame A and cutter-bar B together by two pivots at right angles to each other, as shown in fig. 3, and permits the said cutter-bar to be readily elevated at its outer end as occasion may require, and also as readily to permit the points of the fingers of the said bar to be elevated as occasion may require.

These movements of the bar B are effected by means of the links $g'$, crank $g''$, and a hand or foot-lever, H, within reach from the driver's seat D to elevate the outer end of the said cutter-bar B, and, by means of the hand-lever I', which is jointed to the projecting inner shoe $b'$ of the said cutter-bar B, to elevate the points of the fingers of the same, in either case the said bar D turning freely on the double-hinge joint G.

The said delivery-dropper C consists of a series of light, thin slats, $c'$, projecting from a head-piece, $c''$, which is pivoted to the rear end of the slide or shoe $b'$ of the cutter-bar B, so that it will swing horizontally on its pivot. The free ends of the said slats rest upon a supporting-bar, $b''$, which extends horizontally back from the outer end of the cutter-bar B, (see fig. 1,) and the said dropper C is operated or swung horizontally inward, and also outward to a right angle with the cutter-bar B, (as indicated by the dotted lines $v$–$v$ in fig. 1,) by means of the hand or foot-lever K, and connecting-bar $k'$.

The driver's seat D is supported over the middle of the frame A, and therefore centrally in rear of the draught-animals, by means of the supports $d'$ $d'$ attached to a sheet-metal cap, $d''$, which fits over the master-cog wheel L', and thus protects the driver's feet and the driving-reins from becoming caught by the master-wheel; and also affords the best position for guiding the team.

The tongue E has its inner end pivoted at $e'$, so as to allow of its free movement thereon in a vertical plane, and fixed to the upper side of the said inner end there is an extension, $e''$, which serves as a lever-arm whereby the driver in the seat D can place his foot, and thus press down the forward part of the frame A, and consequently elevate the rear part of the same, as indicated by the dotted lines in fig. 2, and secure this canted position by means of a pin in the rack-bar $c'''$, the double-tree F being attached to the frame A, and therefore being below and free from the said tongue, the canting forward of the said frame does not increase the weight on the draught-animals, nor interfere with the progress of the machine.

In operating the side-delivery dropper C, after the grain has fallen back upon it, the driver, by means of the connecting-lever K, swings the said dropper horizontally outward to about a right angle with the cutter-bar B, as indicated by the dotted lines in fig. 1, and letting it drop, the stubble passes up between the slats C' into contact with the gavel, and thus, in connection with the advancing sliding motion of the said dropper C, the gavel is left behind, when, by a reversed motion, given by the driver to the lever K, the dropper is swung back into place as before. As the grain will continue to be cut, and to fall back whilst the dropper is in its outward position, it is intended that a curved arm or bar, not shown in the drawing, shall be applied, and caused to fall or swing, so that it will receive and support this falling grain, whilst the dropper is swung outward, and rise or swing out so as to let the grain fall upon the dropper immediately on its (the latter's) return in place.

The operation of the other devices having been fully explained, what I claim as my invention, and desire to secure by Letters Patent, is—

The double hinge G, constructed substantially as described, in combination with the frame A, cutter-bar D, links $g'$, crank $g''$, and levers H and I, the said parts being arranged to operate substantially as and for the purpose described.

SAMUEL ROCKAFELLOW.

Witnesses:
  Wm. H. Morison,
  Benj. Morison.